(12) United States Patent
Vandenbaviere

(10) Patent No.: US 10,326,614 B2
(45) Date of Patent: Jun. 18, 2019

(54) COMPONENT AND METHOD FOR MANAGING COMMUNICATION

(71) Applicant: SAGEM DEFENSE SECURITE, Boulogne Billancourt (FR)

(72) Inventor: Yann Vandenbaviere, Boulogne Billancourt (FR)

(73) Assignee: SAGEM DEFENSE SECURITE, Boulogne Billancourt (FR)

( * ) Notice: Subject to any disclaimer, the term of this patent is extended or adjusted under 35 U.S.C. 154(b) by 0 days.

(21) Appl. No.: 14/894,861

(22) PCT Filed: May 23, 2014

(86) PCT No.: PCT/EP2014/060744
§ 371 (c)(1),
(2) Date: Nov. 30, 2015

(87) PCT Pub. No.: WO2014/191330
PCT Pub. Date: Dec. 4, 2014

(65) Prior Publication Data
US 2016/0119164 A1    Apr. 28, 2016

(30) Foreign Application Priority Data
May 30, 2013   (FR) ...................................... 13 54949

(51) Int. Cl.
*H04L 12/46*   (2006.01)
(52) U.S. Cl.
CPC ................................ *H04L 12/4625* (2013.01)

(58) Field of Classification Search
CPC .................................................. H04L 12/4625
See application file for complete search history.

(56) References Cited

U.S. PATENT DOCUMENTS

| | | | |
|---|---|---|---|
| 6,353,596 B1 * | 3/2002 | Grossglauser | H04L 12/185 370/256 |
| 7,051,126 B1 * | 5/2006 | Franklin | H03M 7/3084 709/247 |
| 2002/0039336 A1 | 4/2002 | Mochizuki et al. | |
| 2002/0039366 A1 | 4/2002 | Sano | |
| 2004/0208158 A1 * | 10/2004 | Fellman | H04L 12/6418 370/345 |

(Continued)

FOREIGN PATENT DOCUMENTS

WO    WO 2010/071623 A1    6/2010

*Primary Examiner* — Brandon M Renner
*Assistant Examiner* — Jay L Vogel
(74) *Attorney, Agent, or Firm* — Muncy, Geissler, Olds & Lowe, P.C.

(57) ABSTRACT

A communication management component for organizing data exchanges between communicating devices of an Ethernet type network, the management component having interface means, distribution means adapted to acquire incoming data coming from each communicating device via interface means and to distribute it via the interface means to the other communicating devices, and processor means arranged to control the distribution means in such a manner that the incoming data coming from a sender device is distributed to the other devices, each communicating device in turn becoming the sender device in a first predefined sequence that is repeated cyclically.

13 Claims, 2 Drawing Sheets

(56) References Cited

U.S. PATENT DOCUMENTS

| | | | |
|---|---|---|---|
| 2009/0027061 A1* | 1/2009 | Curt | H02J 13/0055 |
| | | | 324/539 |
| 2011/0268060 A1* | 11/2011 | Heidari | H04B 7/2606 |
| | | | 370/329 |
| 2013/0022045 A1* | 1/2013 | An | H04L 45/025 |
| | | | 370/392 |
| 2013/0259045 A1* | 10/2013 | Johansson | H04L 45/306 |
| | | | 370/392 |
| 2014/0279603 A1* | 9/2014 | Ortiz | G06Q 30/018 |
| | | | 705/317 |

* cited by examiner

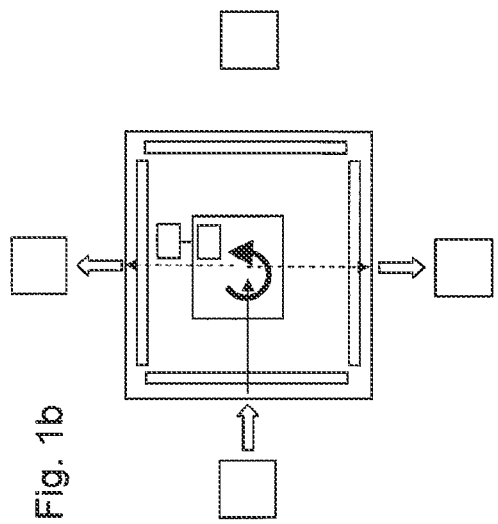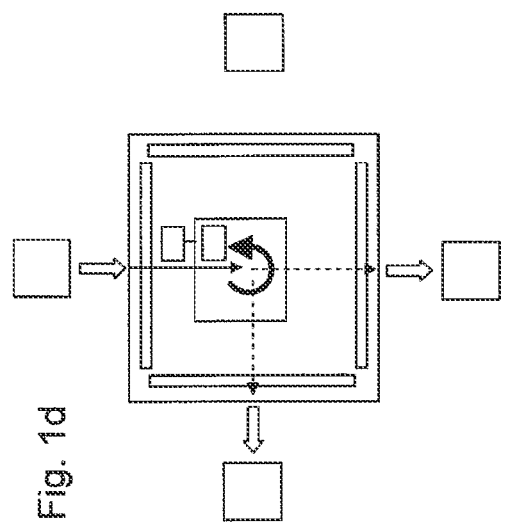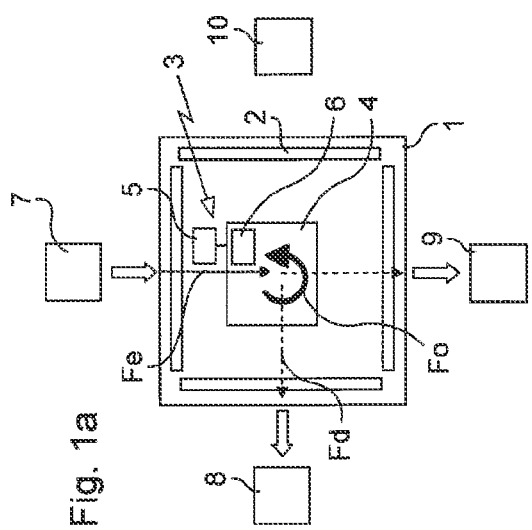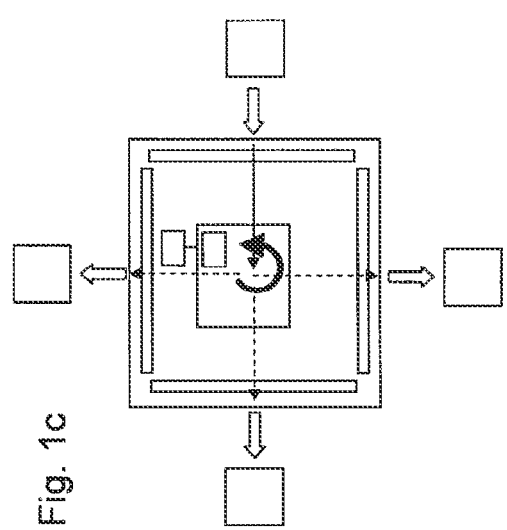

COMPONENT AND METHOD FOR MANAGING COMMUNICATION

BACKGROUND OF THE INVENTION

The architectures of modern avionics systems need to satisfy particularly constraining design requirements, specifically in terms of the performance, the safety, and the reliability of such systems, and also in terms of the weights of the various devices making up such systems (computers, data concentrators, sensors, etc.), and of the cables interconnecting these devices.

These various "technical" requirements often tend to direct architecture designers towards opposing solutions; they are also themselves liable to come into conflict with targets in terms of costs (development costs, recurrent costs involved in manufacturing equipment, etc.).

The choice of data bases and of communications protocols used in architectures for providing communication between the various devices is typically subjected to problems of this type. Thus, in an electric flight control system that presents an architecture that is redundant and that includes numerous devices, it is fundamental firstly to ensure data transmission times that are as short as possible, and secondly to minimize the physical connections between the devices in the architecture, while nevertheless maintaining development and manufacturing costs that are reasonable.

Each of the various available solutions presents disadvantages that are well known: slowness of communication and weight of cables for the ARINC 429 and MIL-STD-1553 standards, cost of deploying an AFDX network, etc.

OBJECT OF THE INVENTION

An object of the invention is to provide a communication management component and method suitable for organizing exchanges of data in a manner that is simple, safe, fast, and inexpensive.

SUMMARY OF THE INVENTION

In order to achieve this object, there is provided a communication management component for organizing data exchanges between communicating devices of an Ethernet type network, the management component comprising:
  interface means for connecting the management component with the communicating devices;
  distribution means adapted to acquire incoming data coming from each communicating device via the interface means and to distribute it via the interface means to the other communicating devices; and
  processor means arranged to define at least one send group and at least one receive group, each constituted by communicating devices, and to control the distribution means in such a manner that the incoming data coming from a particular device referred to as the sender device belonging to the send group is distributed to the devices of the receive group, each communicating device of the send group in turn becoming the sender device in a first predefined sequence that is repeated cyclically.

The management component as obtained in this way is simple and inexpensive. It centralizes data exchanges and thus firstly reduces the lengths of cable needed for providing those exchanges and secondly reduces the transmission times of data exchanges. Furthermore, by organizing these data exchanges in sequential and cyclical manner, said transmission times are further reduced.

The invention also provides a communication management method for organizing data exchanges between communicating devices of an Ethernet type network, the management method including an initial step during which at least one send group and at least one receive group are defined that are constituted by communicating devices, the method including distribution steps each associated with a particular device of the send group referred to as the sender device, during which incoming data coming from the sender device is distributed to the communicating devices of the receive group with the exception of the sender device, each of the communicating devices of the send group in turn becoming the sender device in a first predetermined sequence that is repeated cyclically.

The invention can be better understood in the light of the following description of a particular non-limiting embodiment of the invention.

BRIEF DESCRIPTION OF THE DRAWINGS

Reference is made to the accompanying drawings, in which:

FIGS. 1a to 1d are diagrams showing a communication management component of the invention connected to communicating devices.

DETAILED DESCRIPTION OF THE INVENTION

Figure 2:
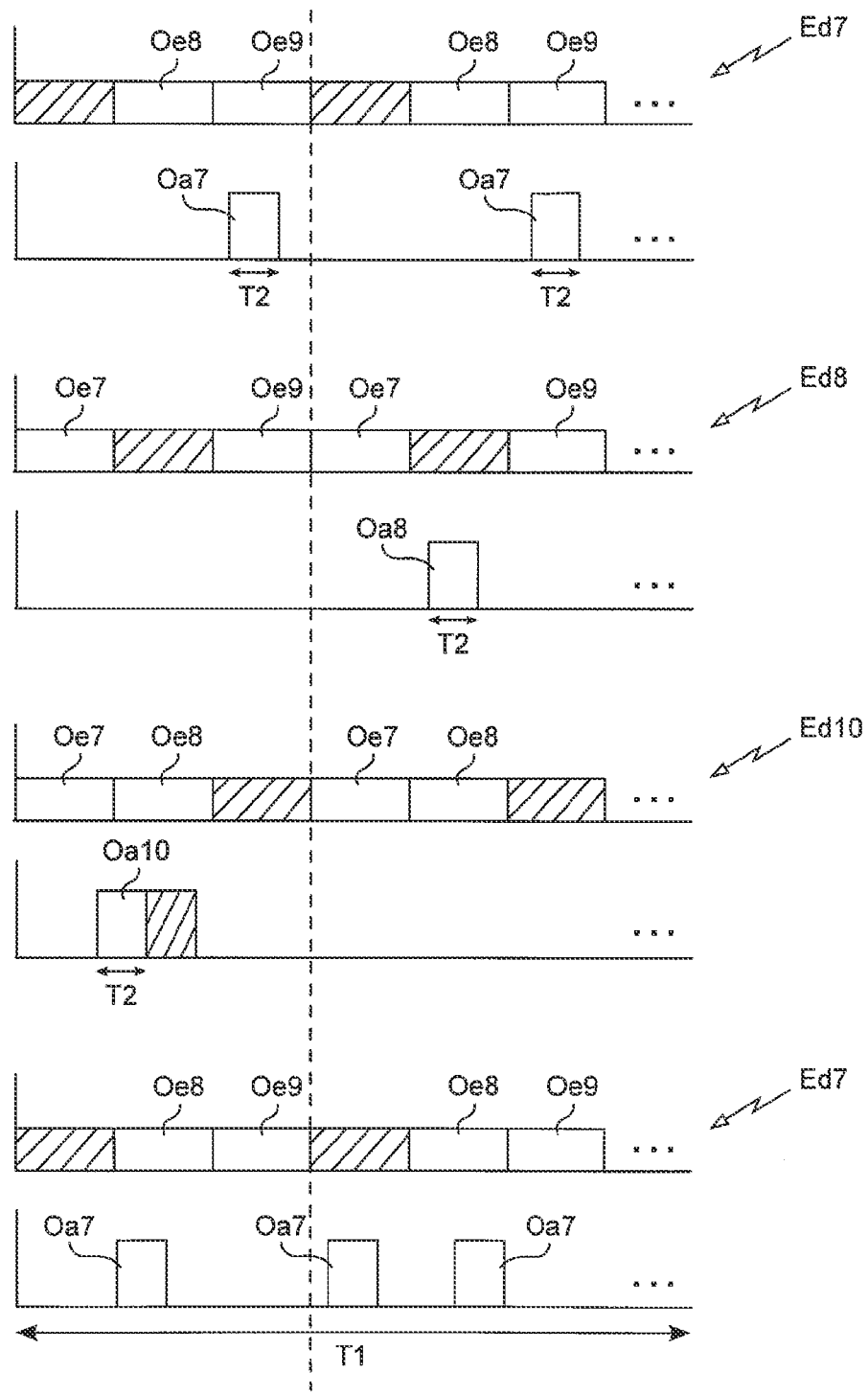
FIG. 2 is a diagram showing steps of distributing the communication management method of the invention.

The communication management component 1, visible in FIGS. 1a, 1b, 1c, and 1d, is used in this example in an electric flight control system of an aircraft.

The management component 1 comprises interface means 2 including in particular connectors enabling various cables to be connected to the management component, distribution means 3, comprising in this example a field programmable gate array (FPGA) type logic circuit 4, and memory means 5 connected to the FPGA 4, together with processor means 6, specifically in this example elements for programming the FPGA, enabling the way it operates to be controlled.

The management component 1 is connected via connection cables that are themselves connected, to the connectors of the interface means 2, to a certain number of communicating devices also forming part of the flight control system, specifically a first computer 7, a second computer 8, a data concentrator 9, and a sensor 10. The communicating devices 7, 8, 9, and 10 in this example form an Ethernet network, i.e. they exchange data among one another using the Ethernet protocol, which exchange of data has a data rate of the order of 100 megabits per second (Mbit/s).

The first computer 7 and the second computer 8 are both arranged to act via the management component 1 to send and receive data going to and coming from other communicating devices. In this example, the data concentrator 9 is arranged solely for receiving data coming from other communicating devices via the management component 1. The data concentrator 9 may optionally also be adapted to transmit data, but this data is not transmitted via the management component 1 and is destined for devices that are not mentioned herein. The sensor 10 is adapted solely to send data that results from the measurements it takes.

The FPGA 4 of the management component 1 is connected to all of the communicating devices via the interface means 2 of the management component 1 and the connection cables. The FPGA 4 can thus acquire incoming data delivered by the communicating devices, possibly store this incoming data in the memory means 5, and redistribute this data to the other devices.

The programming elements 6 are arranged to define a send group and a receive group, each group being constituted by certain communicating devices 7, 8, 9, 10: the send group is formed by the communicating devices 7, 8, and 10 that are adapted to send data via the management component 1, and the receive group is formed by the communicating devices 7, 8, and 9 that are adapted to receive data via the management component 1. The send group is thus constituted by all of the communicating devices with the exception of the data concentrator 9. The receive group is thus constituted by all of the communicating devices with the exception of the sensor 10. It may be observed at this point that the group may be defined either when programming the FPGA 4, or else dynamically (in which case the programming elements 6 may for example be communicated to the FPGA via a random access memory (RAM) by a microcontroller adapted to detect the presence and the types of the communicating devices).

There follows a description of the operation of the management component.

The programming elements 6 control the FPGA 4 so that the incoming data from a particular device referred to as the sender device forming part of the send group is distributed to all of the devices of the receive group, with the exception of sender device, in a first predetermined sequence that is repeated cyclically. This first sequence is an ordered run in which each of the communicating devices of the send group in turn becomes the sender device.

With reference to FIG. 1a, the continuous line arrow Fe represents the path followed by incoming data while the fine dashed line arrows Fd represent the incoming data being distributed to the communicating devices of the receive group, the incoming data coming from the first computer 7 being initially acquired by the management component 1 and then transmitted successively to the communicating devices of the receive group, with the exception of the first computer 7, i.e. to the second computer 8 and then to the data concentrator 9. Thereafter, with reference to FIG. 1b, the incoming data coming from the second computer 8 is transmitted in succession to the data concentrator 9 and then to the first computer 7. Thereafter, and with reference to FIG. 1c, the incoming data coming from the sensor 10 is transmitted to successively to the first computer 7, to the second computer 8, and to the data concentrator 9. Finally, with reference to FIG. 1b, the incoming data coming from the first computer 7 is once more transmitted to the second computer 8, and then to the data concentrator 9: the first sequence is repeated cyclically. The references of the various elements in FIGS. 1b to 1d naturally correspond to the references in FIG. 1a for the same elements.

The incoming data is acquired in this example by the management component 1 using a method of the first-in-first-out (FIFO) type: for a particular sender device, each incoming data item is acquired, possibly stored by the memory means 6, and then redistributed to the devices of the receive group so that the first data to arrive is the first data to be distributed.

Advantageously, the incoming data coming from each of the sender devices is distributed to the communicating devices of the receive group (with the exception of the sender device) during successive send operations of predetermined duration, where a send operation corresponds to distributing incoming data coming from the sender device to one of the communicating devices of the receive group.

It should be observed at this point that the send operations are performed in a second sequence that is repeated cyclically. Specifically, the data transmitted by any sender device is transmitted in the order specified by the thick line arrow Fo.

Advantageously, the first send operation of a sender device begins at the end of the first send operation of the sender device that precedes it in the first sequence.

Thus, each of the communicating devices of the send group sends its data in turn at a predefined instant and for a predetermined duration: this simplifies the exchange of data and the management component itself, and data is exchanged rapidly and safely.

There follows a description of the communication management method of the invention, which is performed in this example by the management component.

The management method comprises an initial step during which the send group and the receive group are defined, the send group being composed in this example by the first computer 7, the second computer 8, and the sensor 10, while the receive group is composed in this example by the first computer 7, the second computer 8, and the data concentrator 9.

The management method further includes acquisition operations Oa7, Oa8, Oa10, associated with each of the devices in the send group, i.e. respectively with the first computer 7, with the second computer 8, and with the sensor 10, each acquisition operation Oa7, Oa8, and Oa10 in this example consisting in acquiring incoming data from the corresponding device of the send group.

The management method also includes distribution steps Ed7, Ed8, Ed10, each associated with a particular device of the send group referred to as the sender device, during which steps the incoming data coming from the sender device is distributed to the communicating devices of the receive group, each of the communicating devices of the send group in turn becoming the sender device in a first predefined sequence that is repeated cyclically.

FIG. 2 shows both the distribution steps, each performed during a certain duration T1, and also the acquisition operations. Each of the distribution steps Ed7, Ed8, and Ed10 includes successive send operations Oe7, Oe8, and Oe9 that are of predetermined duration, with a send operation corresponding to distributing incoming data coming from the sender device to a particular one of the communicating devices of the receive group. Specifically, the operation Oe7 corresponds to distributing data to the first computer 7, the operation Oe8 to the second computer 8, and the operation Oe9 to the data concentrator 9. It can clearly be seen in this example that the send operations are performed in a second sequence that is repeated cyclically: the operation Oe8 always follows the operation Oe7, the operation Oe9 always follows the operation Oe8, and the operation Oe7 always follows the operation Oe9.

The first send operation of a distribution step begins at the end of the first send operation of the preceding step. In FIG. 2, it can be seen that the step Ed7 follows the step Ed10: the first predefined sequence is repeated cyclically.

It may be observed that in the duration T1 shown in FIG. 2, the acquisition operations are performed at instants that are not predetermined, at moments when the incoming data reaches the management component 1. Naturally, during a distribution step corresponding to a sender communicating device, only the data received by the management component 1 during the preceding distribution step is transmitted to the communicating devices of the receive group. Finally, it is possible to allocate predetermined durations T2 to the acquisition operations: for example, it may be observed that the acquisition operation Oal10 associated with the sensor 10 has a duration longer than the predetermined duration: the additional data, corresponding to the shaded portion of the acquisition operation, is not acquired by the management component. These durations T2 may optionally be constant. These durations T2 may optionally be identical for each of the devices of the send group, or they may of durations that differ depending on the devices. Advantageously, when they are different, these durations T2 are nevertheless multiples of a unit time, thus enabling the method to be simplified.

The invention is not limited to the particular embodiments described above, but on the contrary covers any variant coming within the ambit of the invention as defined by the claims.

In particular, it is possible for the incoming data to come from each of the devices of the send group to be distributed to the communicating devices of the receive group during each of the distribution steps in a single send operation that is common to all of the communicating devices of the receive group. It is also possible for this data to be distributed to a plurality of communicating devices of the receive group in a single send operation.

The distribution means may include a different type of logic circuit, e.g. an application-specific integrated circuit (ASIC), or indeed another component capable of performing logic operations, e.g. a microcontroller.

The communications protocol used may be a protocol other than the Ethernet protocol (nevertheless it must be a protocol that is capable of ensuring communication that is safe and fast, such as that implemented in avionics applications), and the rate of data exchange may be other than 100 Mbit/s.

Provision may be made for each sender device to be associated with a particular receive group: for example, the device 7 might send data only to the devices 8 and 9; the device 8 might send data only to the device 9; the device 9 might send data only to the device 7; and the device 10 might send data to all of the other devices. A group may thus comprise only a single device. Conversely, all of the devices could be called on to send data to all of the other devices: under such circumstances, provision is made initially for all of the devices to belong both to the send group and also to the receive group.

Although the invention is illustrated above with four devices connected to the management component, it is naturally possible to connect said management component to some other number of devices.

The invention claimed is:

1. A communication management component for organizing data exchanges between communicating devices of an Ethernet type network, the management component comprising:
   interface means for connecting the management component with the communicating devices;
   distribution means adapted to acquire incoming data coming from each communicating device via the interface means and to distribute it via the interface means to the other communicating devices;
   a field programmable gate array type logic circuit; and
   processor means arranged to define, at the time of programming the field programmable gate array type logic circuit or by communicating to the field programmable gate array type logic circuit through a random access memory, at least one send-only group, at least one receive-only group and at least one send-and-receive group, each constituted by communicating devices, and to control the distribution means in such a manner that the incoming data coming from a particular device referred to as a sender device belonging to the send-only group or the send-and-receive group is distributed to the devices of the receive-only group and the send-and-receive group with the exception of the send device, each communicating device of the send-only group and the send-and-receive group in turn becoming the sender device in a first predefined sequence that is repeated cyclically, the send-only group including a sensor and the receive-only group including a data concentrator,
   wherein the send-only group is formed by communicating devices that are adapted to only send data,
   wherein the receive-only group is formed by communicating devices that are adapted to only receive data,
   wherein the send-and-receive group is formed by communicating devices that are adapted to both send and receive data, and
   wherein send operations are performed in a second predefined sequence that is repeated cyclically.

2. The communication management component according to claim 1, wherein the incoming data coming from the sender device is distributed to the communicating devices of the receive-only group and the send-and-receive group during one or more successive send operations of predetermined duration, the send operation corresponding to distributing incoming data coming from the sender device to at least one of the communicating devices of the receive-only group and the send-and-receive group.

3. The communication management component according to claim 2, wherein the first send operation from the sender device begins at the end of the first send operation from the preceding sender device in the first sequence.

4. The communication management component according to claim 1, wherein at least one communicating device is not adapted to generate data for other communicating devices via the management component and is therefore not included in the send-only group.

5. The communication management component according to claim 1, wherein at least one communicating device is not adapted to receive data coming from other communicating devices via the management component and is therefore not included in the receive-only group.

6. The communication management component according to claim 1, wherein the incoming data is acquired using a FIFO type method.

7. The communication management component according to claim 1, wherein data is exchanged at a rate of the order of 100 Mbit/s.

8. The communication management component according to claim 1, wherein the distribution means comprise a logic circuit of FPGA or ASIC type.

9. A communication management method for organizing data exchanges between communicating devices of an Ethernet type network, the management method comprising:
   an initial step during which at least one send-only group, at least one receive-only group and at least one send-and-receive group are defined, at the time of programming a field programmable gate array type logic circuit or by communicating to the field programmable gate array type logic circuit through a random access memory, that are constituted by communicating devices; and distribution steps each associated with a particular device of the send-only group and the send-and-receive group referred to as a sender device, during which incoming data coming from the sender device is distributed to the communicating devices of the receive-only group and the send-and-receive group with the exception of the sender device, each of the communicating devices of the send-only group and the send-and-receive group in turn becoming the sender device in a first predetermined sequence that is repeated cyclically, the send-only group including a sensor and the receive-only group including a data concentrator, wherein the send-only group is formed by communicating devices that are adapted to only send data, wherein the receive-only group is formed by communicating devices that are adapted to only receive data, wherein the send-and-receive group is formed by communicating devices that are adapted to both send and receive data, and wherein send operations are performed in a second predefined sequence that is repeated cyclically.

10. The management method according to claim 9, during which each distribution step comprises one or more successive send operations of predetermined duration, the send operation corresponding to distributing incoming data coming from the sender device to at least one communicating device of the receive-only group and the send-and-receive group.

11. The management method according to claim 10, wherein the first send operation of a distribution step begins at the end of the first send operation of the preceding distribution step.

12. The management method according to claim 10, wherein the predetermined duration is the same for each of the distribution steps associated with each device of the send-only group and the send-and-receive group.

13. The management method according to claim 10, wherein the predetermined duration differs for at least two distribution steps associated with two different devices of the send-only group and the send-and-receive group, said predetermined duration being a multiple of a common unit time.

* * * * *